No. 775,828. PATENTED NOV. 22, 1904.
L. KIRSCH.
EYEGLASSES.
APPLICATION FILED NOV. 21, 1903.
NO MODEL.
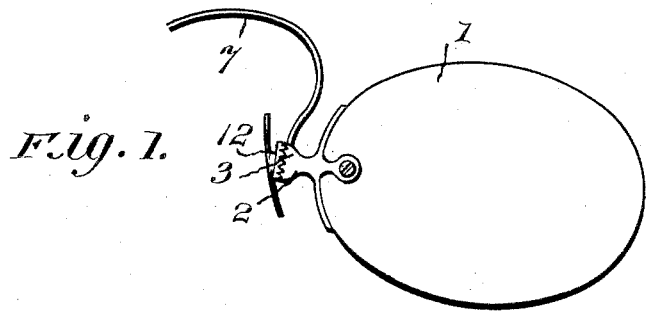
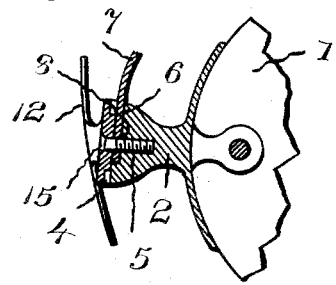
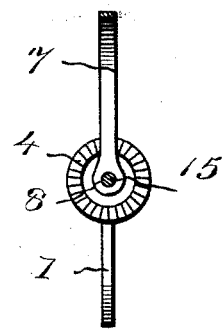
Witnesses
Y. W. Riley
Chas. S. Hyer.
Inventor
L. Kirsch.
By Victor J. Evans
Attorney No. 775,828. Patented November 22, 1904.

UNITED STATES PATENT OFFICE.

LOUIS KIRSCH, OF YONKERS, NEW YORK.

EYEGLASSES.

SPECIFICATION forming part of Letters Patent No. 775,828, dated November 22, 1904.

Application filed November 21, 1903. Serial No. 182,127. (No model.)

*To all whom it may concern:*

Be it known that I, LOUIS KIRSCH, a citizen of the United States, residing at Yonkers, in the county of Westchester and State of New York, have invented new and useful Improvements in Eyeglasses, of which the following is a specification.

This invention relates to eyeglasses, and more particularly to certain improvements in mountings for such class of devices.

Generally opticians at the present time keep in stock lenses having different characteristics for skeleton eyeglasses provided with holes to fasten the strap connected to the stud or post at the center line of the rim, and by using the ordinary mounting in many cases the eyeglass sets up too high on the forehead, particularly in the cheaper grade of eyeglasses, with a consequent inconvenience to the patient. In view of this disadvantage many opticians are required to prepare the lenses to accommodate variations in facial contours, and in view of certain prescriptions that may be presented and in filling such orders or prescriptions the holes of the lenses are frequently drilled above the center line to prevent such lenses from being positioned too high when the glasses are applied. A further custom adopted by some opticians is to use different guards, which is of great inconvenience, and a majority of opticians apply glasses on ignorant persons in any way possible to make a sale, irrespective of the injury that will result to the eyes.
The present invention contemplates the use of a mounting which may be very easily adjusted by simply loosening the stud or post screw and rotating the guard a little higher to drop the lenses.
Another advantage of the present improvement is that the same guard can be used for right and left, and the usual form of nose-pad may be dispensed with, especially in gold guards, by forming each guard with beads on the edge and hollows in the center.

In the drawings, Figure 1 is a front elevation of a portion of an eyeglass embodying the features of the invention. Fig. 2 is an enlarged detail sectional view through the stud or post to show the manner of applying the guard-arm, a part of the lens being also illustrated. Fig. 3 is a transverse vertical section through the spring of the eyeglass and illustrating the inner terminal of the post or stud in elevation. Fig. 4 is an enlarged detail elevation of one of the guards.

Similar numerals of reference are employed to indicate corresponding parts in the several views.

The numeral 1 designates a lens of any preferred characteristic having a stud or post 2, secured thereto in the usual manner and embodying ordinary structural characteristics for engaging the lens. The inner terminal of the post or stud 2 is enlarged to provide a head 3, having a serrated face 4 at its inner terminal and a central screw-opening 5. The upper portion of the head 3 is constructed with a vertical slot 6 to receive a terminal of the spring or bow 7, said spring-terminal also having an opening 8 therein adapted to aline with the opening 5 when said spring-terminal is fully inserted in the slot 6. The slot 6 will have a width approximately equal to that of the spring, so that the latter will be prevented from shifting or having the least movement, and thus avoid loose assemblage of the parts and a positive position of the lens relative to the spring. It will be observed in this connection that the usual structure of the spring 7 is not in the least modified and, as will be hereinafter specified, the adjustment of the lenses of the eyeglass will not in the least affect the position of such spring nor require that the spring be proportionately adjusted.

The guard 9 in this instance, as clearly shown by Fig. 4, has a circular head 10 at one end of its arm 11 and a segmental pressure member 12 at the opposite extremity to engage the nose of the wearer. The head 10 has one face formed with a series of ratchet-teeth 13 to interlock with the teeth 4 of the post-head 3, as clearly shown by Fig. 1, and through the center of the guard-head 10 is an opening 14, adapted to aline with the openings 5 and 8, respectively, formed in the stud-head and terminal of the spring 7, the several openings set forth being designed to receive a stud-screw 15, threaded throughout the greater length thereof and adapted to be loosened to permit the guard-head 10 to be shifted on the head 2 of the post. When the screw 15 is tightened, the teeth of the heads 3 and 10 are held firmly interlocked and accidental movement of the lens is prevented. In view of the fact that the slot 6 is located outwardly a suitable distance from the plane of the teeth 4 of the post-head 3 the adjustment of the guard will not meet with any interference from the the spring-terminal and the latter will always remain in a positive position after its initial application or until necessity requires that a new spring be substituted for one that has become unfit for further use. By the adjustable features set forth the lenses can be positioned as may be desired to conform to various facial contours and also to rectify physical defects in eyes.

The segmental pressure or binding member 12, forming part of the guard, has been specially devised to obviate the use of rubber, cork, shell, or other pads without in the least detracting from its efficiency in holding characteristics and to render it particularly advantageous in the construction of gold glass-mountings. To arrive at the result sought, the member 12 is formed with a series of beads or spherical projections 15, adjacent to the edges of said member, which form a hollow space 16, extending centrally through the length of such member and conform to the longitudinal contour of the latter. When the holding or pad member 12 engages the nose of the wearer, it sets up sufficient suction with the skin by reason of the beads or projections 15 and the hollow spaces 16 to prevent the glasses from slipping from applied position.

The improved mounting set forth will be found exceptionally simple, and in view of the construction of the guard as an entirety it may be reversed and used in connection with either the right or left post or stud. This capability of applying the improved guard reduces the cost of manufacture to a minimum, as well as providing a convenience in the assemblage of the parts of the mounting.

Having thus fully described the invention, what is claimed as new is—

1. A guard for an eyeglass, having a serrated head with an arm projecting radially therefrom and continuing into a segmental pressure member which extends above and below the said arm, said member having a series of circular projections in close arrangement adjacent to the edges thereof to form a hollow space centrally disposed throughout the length of such member.

2. In an eyeglass, the combination with lenses, having studs with central screw-sockets and inner serrated terminals and a spring having its ends held within the said serrated terminals, of guards, each of which has a serrated head with an arm projecting radially therefrom and continuing into a segmental pressure member which extends above and below the said arm, the said member having a series of circular projections in close arrangement adjacent to the edges thereof to form a hollow space centrally disposed through the length of such member, the guards being readily reversible and applicable to either stud, and stud-screws extending through the guards and spring ends into the studs.

In testimony whereof I affix my signature in presence of two witnesses.

LOUIS KIRSCH.

Witnesses:
  CHAS. W. GROLL,
  HERMAN MOELLER.